United States Patent [19]

Radzins et al.

[11] Patent Number: 5,176,244
[45] Date of Patent: Jan. 5, 1993

[54] HIGH SPEED VARIABLE COUNT MECHANICAL STACKER

[75] Inventors: Edmund Radzins; Werner Schweizer, both of Boynton Beach, Fla.

[73] Assignee: Curt G. Joa, Inc., Boynton Beach, Fla.

[21] Appl. No.: 760,150

[22] Filed: Sep. 16, 1991

[51] Int. Cl.⁵ .............................. B65G 47/26
[52] U.S. Cl. ................... 198/430; 414/798.6; 414/798.7
[58] Field of Search ............... 198/430; 414/798.2, 414/798.6, 798.7

[56] References Cited

U.S. PATENT DOCUMENTS

| | | | |
|---|---|---|---|
| 2,601,914 | 7/1952 | Davies | 198/430 |
| 3,724,639 | 4/1973 | Hara | 198/430 |
| 4,399,905 | 8/1983 | Lance et al. | |
| 4,660,711 | 4/1987 | Alonso et al. | 198/430 |
| 4,768,642 | 9/1988 | Hunter | 198/429 |
| 4,927,322 | 5/1990 | Schweizer et al. | |

FOREIGN PATENT DOCUMENTS

0277443 4/1990 German Democratic Rep. ............... 414/798.6

Primary Examiner—H. Grant Skaggs
Attorney, Agent, or Firm—Fuller, Ryan, Hohenfeldt & Kees

[57] ABSTRACT

A pair of closed loop chains running in parallelism have uniformly spaced apart paddles on them for transporting an article such as a pad between each paddle to a pad ejection station. A shaft orbits about an axis which is parallel to the direction in which the paddle conveyor is moving. The shaft carries a plurality of ejector rods which are mounted on a sleeve that is slidable reversibly axially on the orbiting shaft. After the orbiting rods collectively eject a series of pads from the paddles, the shaft continues its orbital movement until it reaches the back side of the pads again. While the rods are passing through the paddles to eject the number of pads composing a stack, the sleeve on the orbiting shaft is translated axially in the same direction and at the same speed as the paddle conveyor is moving. The sleeve is shifted by having a cam follower thereon come into contact with a stationary cam when the rods begin their passage through the spaces between the paddles. When rods clear the spaces between the paddles, a spring restores the rods to their initial position. The orbiting shaft can be caused to dwell in its orbit to allow a selected number of pads to arrive on the conveyor at the ejection station before orbiting the rods to cause ejection of the articles is initiated.

8 Claims, 5 Drawing Sheets

HIGH SPEED VARIABLE COUNT MECHANICAL STACKER

BACKGROUND OF THE INVENTION

The invention disclosed herein pertains to a machine for forming stacks of articles In particular, the invention resides in an improved mechanism for stripping a stack of articles from a conveyor in a stacking machine without stopping the machine to facilitate the stripping operation. The individual stacks of articles are usually forwarded to a packaging machine which is set up to insert a predetermined number of articles comprising a stack into a package The new stripping device is especially efficacious for stripping stacks of pliant or supple articles such as sanitary pads and disposable diapers from the conveyor in the machine.

For the sake of brevity, the stacking machine will be called a stacker herein. Stackers for forming stacks of pliant articles have been in commercial use for years Generally, a stacker is positioned at the output of a machine which makes articles such as diapers or pads. The articles are conveyed into the stacker and when a predetermined number of the articles reaches a pad removal station, a quick acting mechanism ejects the stack without requiring any stopping or even slowing down of the conveyor. Hence, in most cases, conventional stackers have been able to take the output of articles from the production machine at whatever rate the machine produces the articles. However, the state-of-the-art machines which produce diapers, pads and other articles have much higher product output rates than predecessor machines. For instance, the last generation of pad making machines typically would be capable of producing as many as 650 pads per minute. The stacker technology was available for designing stackers which could form and remove stacks at a rate which matched the output from the pad forming machine. The latest pad forming machine designs are capable of producing pads at the rate of 800 per minute but the speed of stackers has not kept up so the production rate capabilities of the pad making machines have not been fully exploited.

One type of stacker is disclosed in U.S. Pat. No. 4,399,905. Basically, in this stacker three pairs of axially spaced apart sprockets have their axes of rotation arranged at the corners of a triangle. Pairs of conveyor chains run over the triangularly arranged sprockets and there are paddles on the conveyor chains which extend outwardly therefrom. The chain runs continuously. Pads are deposited on the paddles where the paddles are spread apart as a result of the chain going around one of the corners of the triangle. The pads, such as diapers, are carried on the paddles in series At a stack ejection station where the paddle carrying pair of chains becomes vertical, the paddles become horizontal so that there is one pad above another on the paddles. At this time, a stripper bar is projected transversely to the stack of superimposed pads for stripping the stack from the paddles. Two of the pairs of sprockets are movable vertically. One of the pairs is driven upwardly by a rotating cam and follower arrangement during the stripping operation such that the vertical run of the chain is lifted at the same rate at which it is translating downwardly so that motion of the pads in the stack which is about to be stripped is stopped relative to a fixed point off of the machine. As soon as the stack is stripped, the two pairs of sprockets are allowed to descend again to their lowermost position while the conveyor chain advances with the paddles on it to form a new stack at the stack discharge station. Forcible lowering of at least one pair of the sprockets is accomplished with an actuator in the form of a pneumatic work cylinder which must restore the one pair of sprockets at a rapid rate instantly after the stack is stripped. Experience has shown, however, that pneumatic cylinders or actuators become unstable and operate erratically at very high speeds. Consequently, the pneumatic cylinder is the principal cause for the stacking rate being limited in prior stackers.

Another type of stacker such as is illustrated in U.S. Pat. No. 4,927,322 also uses triangularly arranged pairs of sprockets on which a closed loop chain which carries paddles runs. In this design, a stripper bar is driven transversely of an accumulated stack of pads by means of a pair of pneumatic actuators or work cylinders. By appropriate timing, one of the work cylinders drives the vertical stripper bar transversely to the stack of pads on the superimposed paddles without an attempt to stop relative motion of the paddles. When the stripper bar is projected outwardly to strip the stack under the influence of one of the pneumatic actuators, the two actuators cooperate to cycle the stripper bar by moving it downwardly and inwardly and upwardly so it arrives behind the accumulating stack before the number of articles which compose a stack has accumulated at the stripping station. In this design the erratic and unstable operation of the pneumatic operators also limit the frequency at which stacks can be stripped from the stacker.

SUMMARY OF THE INVENTION

A principal object of the invention is to provide a stacker which can form and discharge stacks of articles for packaging at a higher rate than has heretofore been achieved.

According to the invention, a closed loop conveyor chain runs on pairs of sprockets whose axes of rotation are coincident with the corners of a triangle as is commonplace in prior art machines. Paddles extend outwardly from the closed loop conveyor chains and there is a horizontal run of the chains where a selected number of pads composing a stack arrive at a stripping station. The stripper at the stripping station comprises a rotationally and orbitally driven shaft which is carried at its ends in bearings which are mounted to the end portions of spaced apart arms. The arms are driven rotationally so as to carry the shaft along an orbital path. A sleeve is slidable axially over a short distance on the shaft. A series of split clamp rings are clamped onto the sleeve and a pad ejector rod extends radially from each one of the clamp rings so as to provide a row of rods which project radially away from the shaft. A cam follower is carried on the sleeve. The follower comes into contact with a stationary cam throughout part of the orbital path of the shaft. At the same moment as the ejector rods start in their orbital path to pass between the paddles which have the pads between them, the cam causes the sleeve and, hence, the clamping rings which support the ejector rods to slide axially on the shaft through a distance equal to the distance between two adjacent paddles. Since the paddles are moving linearly at the same speed as the rods are being shifted axially by the cam, the rods have time to eject a stack of pads corresponding in number to the number of ejector rods which are mounted to the axially slidable sleeve. The new stacker can be quickly adapted for forming stacks composed of various numbers of articles by simply adjusting some of the ejector rods into or out of active positions and also inserting a delay or dwell period in the time it takes for the ejector rods to start the next orbit. How the foregoing general features and other basic features of the new stacker are implemented will now be described in greater detail in reference to the accompanying drawings.

DESCRIPTION OF A PREFERRED EMBODIMENT

Figure 1:
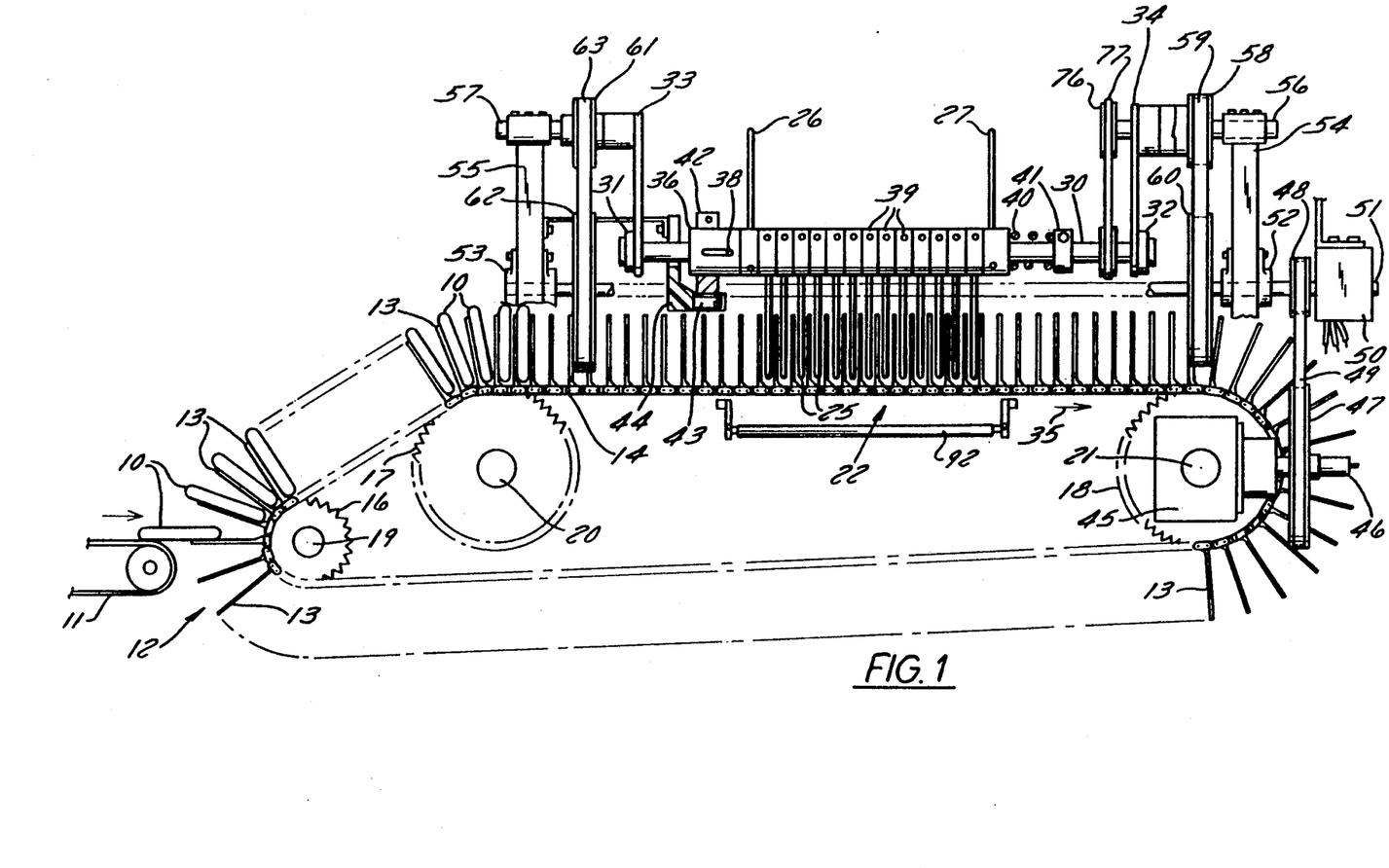
FIG. 1 is a front elevational view of the new stacker showing the positions of the machine parts a moment before ejection of a stack of articles starts.
Figure 8:
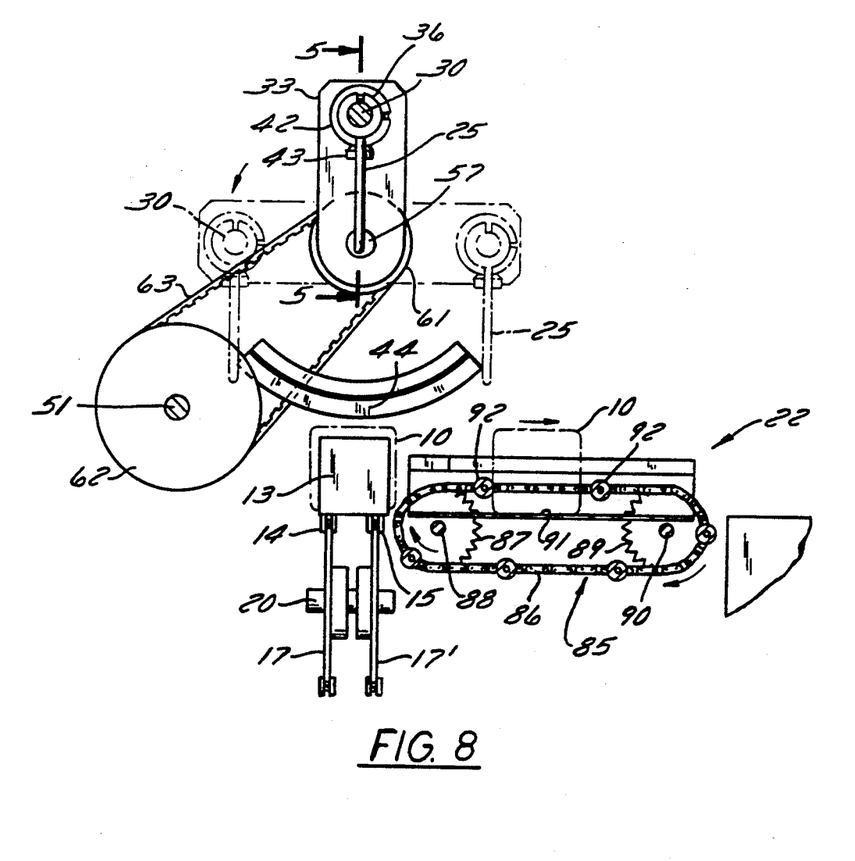
FIG. 8 is a view of the stacker looking at one end thereof.

Attention is invited to FIG. 1 which is a front elevational view of the new stacker. Articles 10 which are to be stacked are delivered to the stacker by means of a belt conveyor 11. The articles 10 used to demonstrate construction and operation of the machine may be sanitary pads, disposable diapers or other pliant articles although the stacker can handle rigid articles as well. Articles are fed at the infeed station to the stacker at the infeed station 12 where they are deposited on a series of paddles 13 which extend from a pair of conveyor chains, one of which chains 14 is visible in FIG. 1. Chain 14 runs on three sprockets 16, 17 and 18 which are on shafts 19, 20 and 21, respectively. There are sprockets corresponding to 16, 17 and 18 on the same shafts which are concealed from view in FIG. 1. There is also a chain 15 (see FIG. 8) running in parallelism with chain 14. Each of the paddles 13 is connected to chain 14 in the foreground of FIG. 1 and to chain 15 in the background. As shown in FIG. 8, chain 15, for example, runs on a sprocket 17' which corresponds to sprocket 17 in FIG. 1.

In FIG. 1, the articles 10 are fed into the stacker at the infeed station 12 where the chains run over a small diameter sprocket 16 which causes the paddles to diverge so there is no interference by the paddles to depositing the articles on them.

As is evident in FIG. 1, the chain 14 has a long substantially horizontal run between sprockets 17 and 18. The paddles 13 along the horizontal run are standing vertically. Ejection of a predetermined number of articles 10 (hereafter called pads) constituting a stack occurs at a discharge station generally indicated by the numeral 22. The articles are pushed off of the conveyor by means of a plurality of pad ejector rods 25 which are driven about a circular orbit during which the rods are always kept in a vertical altitude as will be explained. In FIG. 1, the rods 25 are about to begin passing between the moving paddles to sweep out or eject a preselected number of pads which compose a stack. In the FIG. 1 example, 13 rods are active in which case 13 count stacks are produced. Two rods, 26 and 27 are clamped in inactive position. If a stack were to have a six pad count, the first six rods, including rod 26, at the entry to the discharge station 22 would be active and the last nine rightmost rods would be clamped in inactive position. The particular design depicted in FIG. 1 is capable of producing stacks containing a maximum of fifteen pads. As will be explained hereafter, technical considerations influence designing for a minimum number of pads in a stack such as, perhaps, five or six pads.

The manner in which the pusher fingers or ejector rods 25 are controlled will now be described. Above the chain conveyor 14 and extending horizontally lengthwise of the conveyor there is a shaft 30 which is journaled in bearings 31 and 32 at its opposite ends. Bearings 31 and 32 are mounted in the outboard ends of two swingable arms 33 and 34. Arms 33 and 34 are swingable about horizontal axes for swinging shaft 30 through a circular orbit. When the shaft 30 is near the lowermost part of its orbit as it is in FIG. 1, for example, it is in a position where further orbital motion will cause the ejector rods 25 to transmit or sweep between the paddles 13 to effect ejection of the pads which are being conveyed between the paddles. As will be explained, the ejector mechanism is such that when the rods 25 begin to pass between the paddles at the pad discharge station 22, the rods 25 are translated at the same speed and in the same direction as the paddles are moving, which direction is indicated by the arrow 35. The arrangement provides for ejecting the pads to form a stack without requiring stopping or slowing translation of the conveyor chains 14 and 15.

The manner in which the ejector rods 25 are moved over a distance equal to the paddle-to-paddle pitch at the same rate and in the same direction as the paddles during ejection will now be discussed. As is clearly shown in FIGS. 1, 2 and 3, a sleeve 36 is fitted on orbital shaft 30 for sliding axially within limits set by a slot 37 in the sleeve striking a stop and drive pin 38 in shaft 30. A plurality of split clamp rings, such as the one marked 39, are clamped onto axially slidable sleeve 36. Ejector rods 25 are attached in a straight row to clamp rings 39, respectively. As will be explained, during operation of the machine, shaft 30 is rotated in a manner which keeps the row of ejector rods 25 vertically oriented at all times during their orbit. After the sleeve 36 and all of the clamp rings 39 and rods 25 thereon is shifted to its right limit from its left limit while the ejector rods are transiting the space between paddles as depicted in FIG. 1, the sleeve is returned to its leftmost position again as it appears in FIG. 1 by means of a return spring 40. The return spring 40 reacts against a stop 41 which is fastened to orbiting shaft 30.

Shifting of the sleeve 36 at a rate which causes the ejector rods 25 to move in step with the paddles is accomplished by means of a cam and follower arrangement. As is evident in FIGS. 1, 2, 3, 7 and 8, there is a retainer 42 clamped to axially slidable sleeve 36 and the retainer has a cam follower roller 43 journaled for rotation on it. A stationary cam 44 extends over part of the orbital path of follower 43. The profile of the cam 44 can be seen best in FIG. 3 and its arcuate extent can be seen in FIGS. 7 and 8 too.

Figures 3, 4:
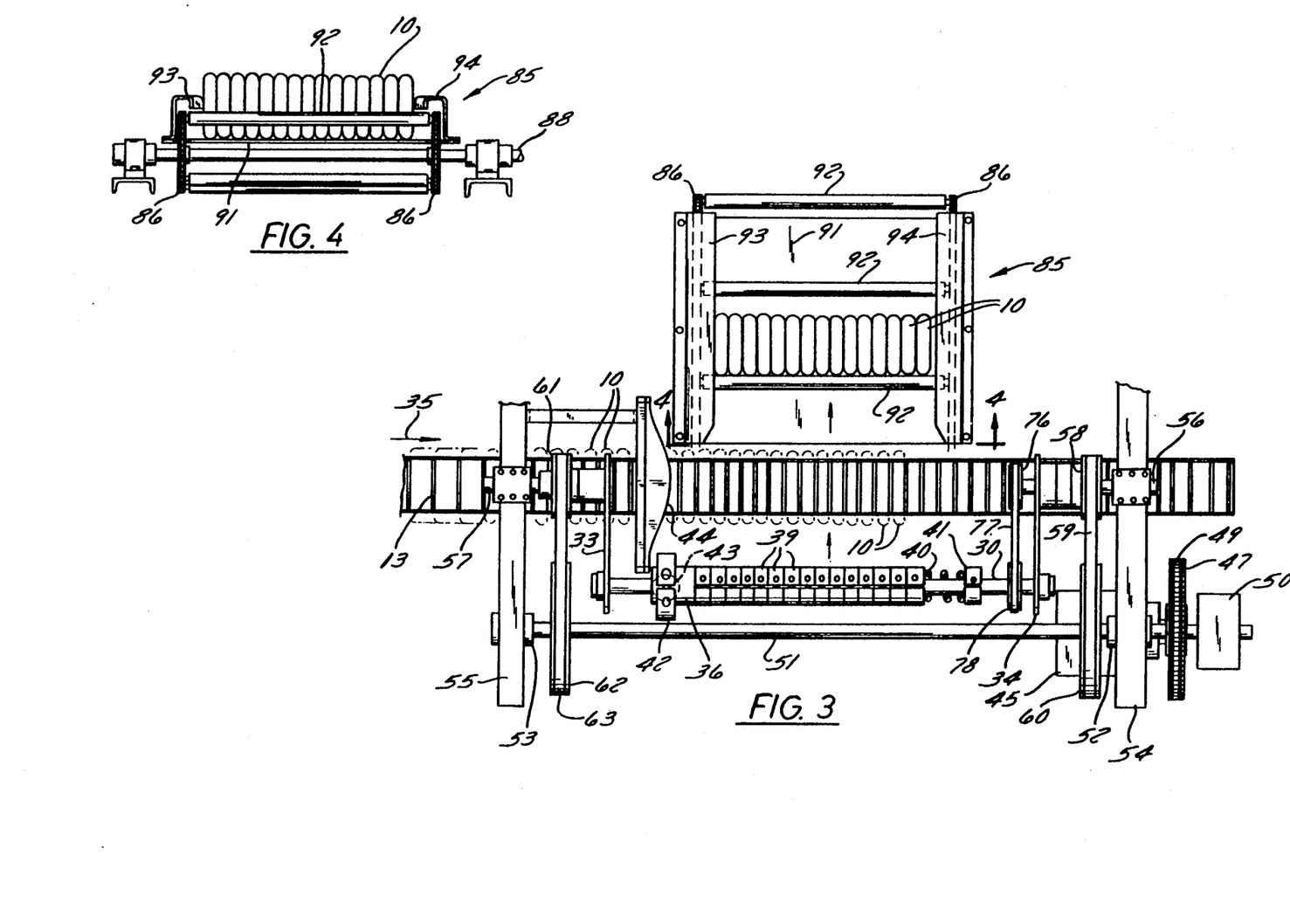
FIG. 3 is a top plan view of the stacker.
FIG. 4 is an isolated elevational view of a part of the stacker taken on a line corresponding with 4—4 in FIG. 3.

During most of the orbital movement of shaft 30, cam follower roller 43 is not in contact with cam 44. In the illustrated design, the follower and cam are in contact over an angle of about 60° during which time the active ejector rods 25 sweep through a corresponding number of spaces between paddles to push the pads 10 from between the paddles to form a stack having a count equal to the number of active ejector rods. If desired, cam 44 could be mounted to sleeve 36 and the follower roller 43 could be stationary but rotatable.

As shown in FIG. 1, the mechanical power input to the stacker is through a transmission device 45. Shaft 21 on which sprocket 18 is fastened is the power input to the transmission and is coupled to the main drive shaft, not shown, so all parts of the machine are held in the same phase relationship. The transmission has a power output shaft 46 on which a toothed pulley 47 is fastened. Pulley 47 is coupled in driving relationship with a smaller toothed pulley 48 by means of a toothed belt 49 which is otherwise known as a timing belt. Toothed pulley is the power infeed pulley for an electrically operated clutch 50. When clutch 50 is activated, it connects small pulley 48 to a jack shaft 51 and the jack shaft rotates. The jack shaft 51 is journaled in bearings 52 and 53 which are mounted in stationary machine frame members 54 and 55, respectively. Frame members 54 and 55 also support two widely spaced apart coaxial shafts 56 and 57 which are held stationary. A toothed pulley 58 is rotatable relative to the stationary shaft. Pulley 58 is driven through the agency of a toothed or timing belt 59 under the influence of a large pulley 60 which is fixed on jack shaft 51 as shown in FIG. 1. In the same Figure, it will be observed that there is another pulley 61 mounted for rotation relative to stationary shaft 57. A toothed pulley 62, which has the same diameter as pulley 60 and is also fixed to jack shaft 51, is in driving relation with pulley 61 on stationary shaft 57. When clutch 50 is engaged to cause jack shaft 51 to rotate, pulleys 58 and 61 rotate and cause arms 33 and 34 which support orbiting shaft 30 to swing through 360° of revolution. Clutch 50 is a single revolution clutch which means it responds to each energization by driving the jack shaft 51 through a single revolution and then come to a stop at whatever angular position it started from.

Figure 5:
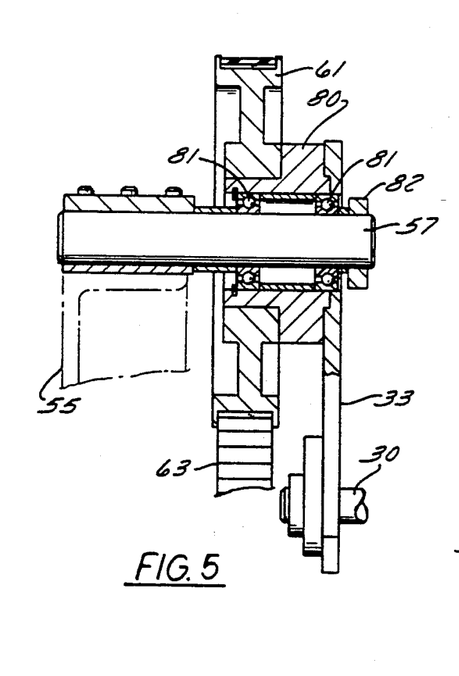
FIG. 5 is a section taken on a line corresponding with 5—5 in FIG. 8.
Figure 6:
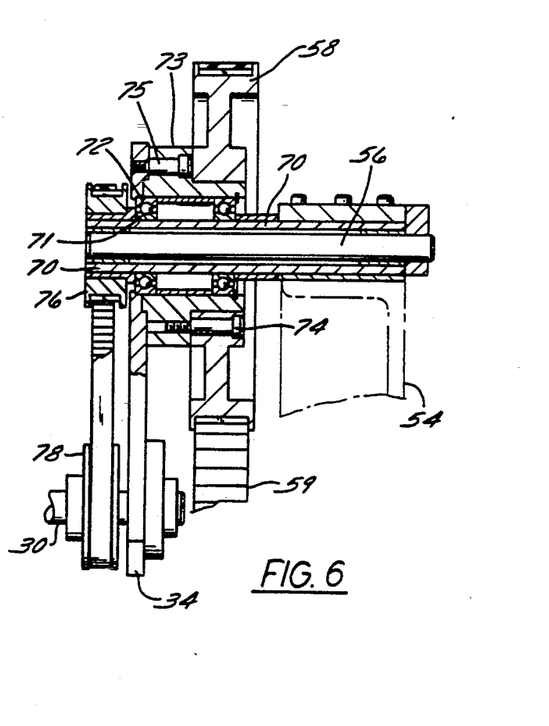
FIG. 6 is a sectional view taken on a line corresponding with 6—6 in FIG. 9.

The details of how the small pulleys 58 and 61 on the stationary shafts 56 and 57, respectively, are driven can be understood by referring to FIGS. 5 and 6. Considering FIG. 6 first, a sleeve 70 is fitted on stationary shaft 56. The inner races 71 of a pair of axially spaced apart ball bearings are fixed against rotation on sleeve 70. The outer races 72 are tightly fitted into the bore of a collar 73. Machine bolts 74 fasten pulley 58 to collar 73. The collar constitutes a hub for pulley 58. The rotating arm 34, that shares the duty with arm 33 which carries the ejector shaft 30 through an orbital path, is clamped to hub 73 by means of machine screws 75. As is evident in FIGS. 1, 2, 6 and 7, for example, there is another pulley 76 fastened to stationary shaft 56. A toothed belt 77 is looped around stationary toothed pulley 76 and around another pulley 78 which is fastened to orbiting shaft 30 for driving the shaft 30 rotationally while it is orbiting. Pulley 78 on shaft 30 simply rolls along the inside of belt loop 77 and serves the purpose of keeping the ejector rods 25 always oriented vertically regardless of where the rods are in their orbit along with orbiting shaft 30. As a result of this, when the ejector rods 25 enter the space between paddles 13 to eject a stack of pads, the active ejector rods are vertical when they enter and exit the spaces containing the pads between paddles of course, the inactive rods, of which there are two in the present setup of the stacker, are also vertical but displaced 180° from the active rods.

FIG. 5 shows in detail the assembly for swinging the other orbiting ejector shaft 30 supporting arm 33 through 360° of revolution coordinated with the other arm 34. In FIG. 5, stationary shaft 57 is shown clamped to stationary machine frame part 55. A bushing, constituting a hub 80 of toothed pulley 61, is journaled on shaft 57 by means of ball bearings such as the one marked 81. Arm 33 is fastened to hub 80. The parts are retained on the shaft by means of a collar 82. Arm 33 participates in carrying shaft 30 through a circular orbit.

Figure 7:
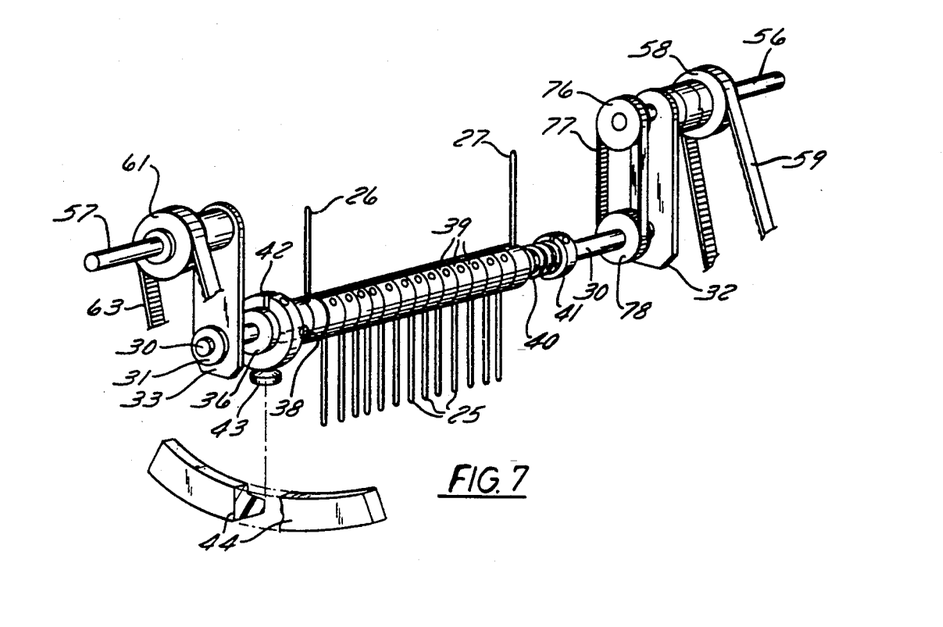
FIG. 7 is a perspective view of the article ejector mechanism isolated from the stacker as a whole to facilitate explaining the relationship between parts.

A better perception of the pad ejector mechanism which has just been described can be obtained from the perspective view in FIG. 7. In this view, it is evident that stationary shafts 56 and 57 are aligned and that the pulleys 58 and 61, respectively, are rotatable and rigidly coupled to arms 32 and 33 so that the arms can make 360° of rotation to thereby orbit shaft 30 through a complete circular path. In FIG. 7, the ejector rods 25 are, at the moment, pointed directly vertically and are maintained in vertical orientation, as previously indicated, by causing pulley 78 on shaft 30 to be driven rotationally by having toothed belt 77 swing around stationary pulley 76.

Allusion has been made to the capability of the new stacker to produce stacks having different counts of articles. The manner in which this will be accomplished will now be discussed. First of all, it is deemed desirable to translate the paddle conveyor chains 14 and 15 at a constant speed regardless of whether a small number or a large number of pads are ejected at one time to form small or large stacks, respectively. Since that is the case in the illustrated embodiment, it is necessary to change the orbiting time of the rod carrying shaft 30 causing the shaft to dwell for different time periods for different count stacks. Assume, for example, that the minimum size stack which will ever be produced contains six pads. The maximum in the illustrated design by way of example and not limitation, as is evident in FIG. 1, would consist of fifteen pads on the assumption that rods 26 and 27 would be rotated from their inactive position as depicted to their active position.

Assuming that a six count stack is the minimum that the stacker will ever produce, the rods 25 will be positioned for pushing out six pads at a time. This means, referring to FIG. 1, that rod 26, which is shown in inactive position, would be rotated into parallelism with the rest of the rods 25 in the row. Then going from left to right, starting with rod 26, and counting six rods until rod 25' is reached, this would be the active group of ejector rods for a six pad count stack. The clamping rings 39 for the other rods would be loosened and all rods to the right of rod 25' would be swung 180° from vertical and would be pointed upwardly after which the clamps would be tightened again. Since the conveyor is running at a constant speed, ejector shaft 30, which carries the ejector rods, will orbit at a constant speed. For the sake of clarity resulting from using concrete numbers and not to imply any limitation of the invention, assume that the ejector rods are orbiting at 100 rpm and six count stacks were being produced. This would amount to ejection of six hundred pads per minute from the conveyed paddles. The design is such that if, in the illustrated embodiment, six count stacks are produced, the shaft 30 can orbit at a continuous speed and each time the ejector rods arrive behind the pads at the discharge station 22, six pads will be aligned with the ejector rods 25 so that the rods can swing through, push a stack out and return to starting position at a time when exactly six pads will be aligned with the ejector rods.

Going to the other extreme, assume that the design shown in FIG. 1 has all of the rods 25 rotated into active position for the purpose of producing fifteen count stacks. If the shaft 30 continues to orbit at a constant speed and without any delay or dwell period being interposed, between the time that one stack is ejected and the ejector rods are in position to eject another, only six pads would have moved into the proper position for being ejected by the first six rods in the row. Consequently, considering the maximum permissible stack count of fifteen in the illustrated model, a delay of orbiting shaft 35 has to be interposed to allow fifteen of the pads to reach the position on the chain conveyor where that number of pads will be lined up with the fifteen rods. Electric clutch 50 aids in assuring that there will be a corresponding pad for whatever number of rods are in active position when the rods enter the spaces between the paddles 13. Under these circumstances, when clutch 50 is engaged, jack shaft drive pulley which is a member of the clutch is coupled to the jack shaft 51 as a result of energizing the clutch. The shafts 30 and ejector rods 25 thereon are allowed to orbit from where they have completed their passage through the spaces between the paddles until they reach a position where they are at some relatively small angle away from their rear ends of the paddles and then the clutch disengages and jack shaft 51 stops or dwells for a timed interval. When sufficient time has elapsed for fifteen of the pads to be in alignment with a corresponding number of ejection rods 25, clutch 50 is energized again and jack shaft 51 begins to turn and effectuates sweeping out of the fifteen pads which are contained in each stack. As previously mentioned, clutch 50 is a one revolution type so it automatically disconnects the pulley 48 from drive shaft 51 when it allows completion of one revolution by the jack shaft. The ejector shaft 30 and ejector rods 25 thereon can be stopped behind the pads on the conveyor when the rods are in a position wherein if they start to orbit again it will take an additional 60°, for example, of orbiting for the rods to clear the paddles.

In general, when the number of active rods is greater than the minimum number which would produce the lowest count stack, the dwell period is increased by an amount equal to the amount of time it takes for said paddles to be translated over a distance equal to the pitch or distance between two consecutive paddles multiplied by the number of active rods in excess of the minimum number.

Figure 2:
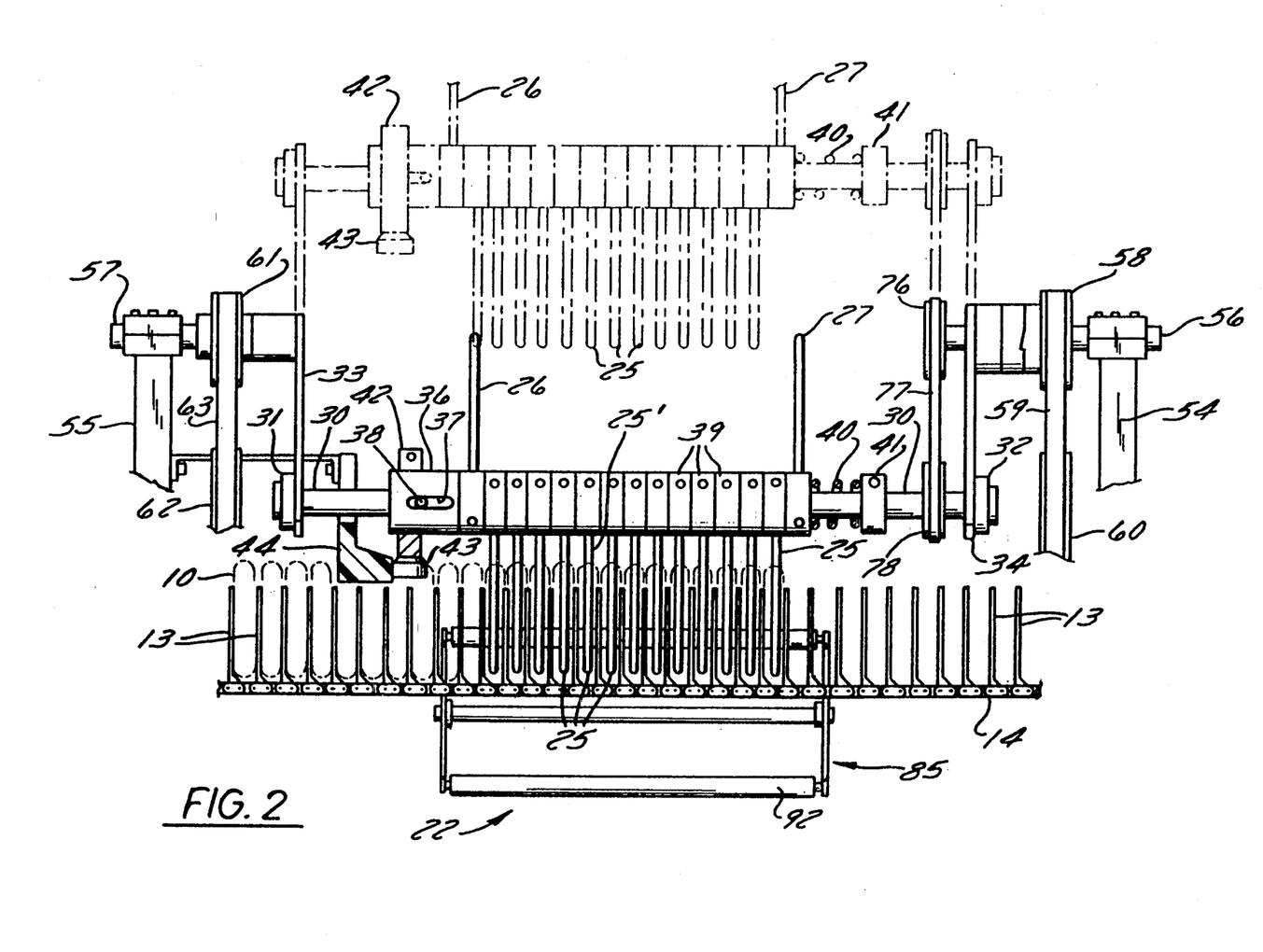
FIG. 2 is a front elevational view of the stacker showing in solid lines the positions of the machine parts when ejection is progressing.
Figure 9:
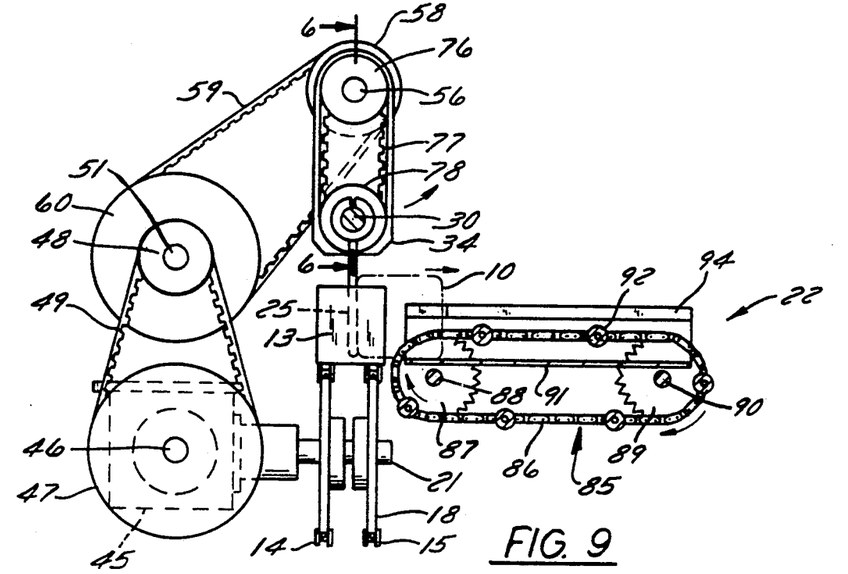
FIG. 9 is another view of the stacker looking at the opposite end thereof.

One may infer from FIG. 1 that the rods are ready to start their swing through the spaces between paddles to eject a stack. This is evidenced by the fact that sleeve 36 which carries the rods is restored to its leftmost position by spring 40 on shaft 30 at the moment. In FIG. 2, however, the cam follower roller 43 is on the highest point of the stationary cam 44 and it will be noted that sleeve 36 is in the process of being shifted to the right as evidenced by the left end of the slot 37 approaching the stop and drive pin 38. As indicated previously, the ejector rods 25 are always shifted over a distance of one paddle pitch while they are sweeping through the spaces between paddles to eject a stack. After a stack of pads is ejected from the chain conveyor, the stack is pushed onto a conveyor generally designated by the numeral 85. A plan view of conveyor 85 is depicted in FIG. 3. As shown in FIGS. 8 and 9, conveyor 85 is essentially conventional in that it is comprised of a chain loop 86 which runs on pairs of sprockets such as the one marked 87 on shaft 88 and the one marked 89 on shaft 90. The pads 10 composing a stack are pushed from between paddles 13 by ejector rods 25 in FIG. 9 and onto a flat surface 91. There are cross bars 92 carried on chain 86 which come up from the bottom of sprocket 87 and assume a horizontal position when they arrive at the upper horizontal run of the chain loop. There are guide rails 93 and 94 which keep the pads stabilized as they are transported on conveyor 85. The pads are then moved to a packaging machine, not shown. FIG. 4 shows how the stack of pads are carried along by conveyor rods 92 on stationary surface 91 after they have been ejected from the conveyor paddles.

FIG. 8 illustrates in phantom lines a stack of pads 10 going along conveyor 85. Arm 33 which carries orbiting shaft 30 is shown in solid lines when it is at the top of its orbital swing but note that a further 90° of rotation wherein the arm 30 is depicted in phantom lines, the ejector rods 25 are still at a substantial distance from the pads which are still accumulating or becoming aligned with the ejector rods while the arm 33 is still in motion. In the case where more than six and up to fifteen pads must accumulate, the arm 33 continues to move in the direction of the arrow and comes to a stop because of the action of single revolution clutch 50. As the arm 33 continues to move past its phantom line position, the rods 25 become more vertical and more in alignment with the line extending between the center of stationary shaft 56 and orbiting shaft 30 in which case the lower tips of the rods 25 can reach to nearly the lower edges of the pads on the paddle conveyor so that the rods, being vertical, attack the vertical edges of the pads squarely. In other words, the tips of the ejector rods do not stick into the edges of the pads.

Although a preferred embodiment of the invention has been described in detail, such description is intended to be illustrative rather than limiting, for the invention may be variously embodied and is to be limited only by interpretation of the claims which follow.

We claim:

1. Apparatus for forming stacks of articles of predetermined count, comprising:

a translationally driven closed loop conveyor having a series of uniformly spaced apart paddles extending therefrom and arranged for being driven past an article infeed station where articles are deposited on successive paddles and past an outfeed station where articles constituting a stack are ejected from a substantially horizontal run of the conveyor, a stack ejector device including a pair of spaced apart arms mounted for being driven rotationally in unison about a common horizontal axis spaced from said horizontal run, a power source for driving said conveyor translationally at a constant speed and means for coupling said arms in driving relationship with the power source, an ejector shaft extending between the arms for orbiting in a circular path when said arms rotate, said shaft having opposite ends mounted in said arms for rotating about an axis parallel to the axis about which the arms rotate and radially spaced from said axis of the arms, ejector rod mounting means mounted on said ejector shaft for sliding reversibly, and a row of ejector rods extending from the respective mounting means radially from the shaft for, during part of the orbit, transiting through the spaces between moving paddles to eject articles from between paddles to form a stack, means operative when said rods enter the spaces between paddles to shift said ejector rod mounting means on said ejector shaft in the direction and at the same speed as the conveyor is moving while the rods are transiting the spaces between paddles, and means for restoring said mounting means to unshifted position when the orbitally moving ejector rods have passed through said spaces to eject the articles.

2. The apparatus according to claim 1 wherein:

said means for mounting said ejector rods comprises a sleeve which is slidable on said ejector shaft, a plurality of clamping members releasably clamped to said sleeve and an ejector rod extending from each clamping member to provide for optionally clamping some of said members with the rods thereon arranged in a row of active rods for ejecting articles together and for clamping other of said members with the rods thereon displaced from said row for the rods thereof to be in inactive positions, means for rotating said ejector shaft while orbiting at a rate correlated with the orbital rate for keeping said ejector rods vertically oriented during the entire orbit.

3. The apparatus according to claim 2 adapted for predetermining the count in a stack wherein:

said means for driving said conveyor translationally drives said conveyor at constant speed, said means for driving said arms rotationally includes a jack shaft and means coupling said jack shaft in driving relationship with the arms, a single revolution clutch operable cyclically to couple said jack shaft to said power source for initiating orbiting of said ejector rods to cause ejection of a stack of articles and to cause the orbiting ejector shaft and ejector rods to dwell for an adjustable period of time at a predetermined orbital angle each time the clutch allows a single revolution of the jack shaft, the length of the dwell period being adjustable to provide for the constant speed conveyor having time to advance to the stack outfeed station a number of consecutive articles which corresponds to the number of ejector rods in the row of active rods.

4. The apparatus according to claim 3 wherein when a predetermined minimum number of ejector rods are in active position the dwell period for the orbiting ejector rods is adjusted to a period of zero duration and the time for said minimum number of articles to accumulate at said outfeed station is equal to the amount of time required for the orbiting ejector rods to complete one orbit.

5. The apparatus according to claim 4 wherein when the number of rods in active position is greater than said minimum number the dwell period is increased by an amount equal to the amount of time it takes for said paddles to be translated over a distance equal to the distance between two consecutive paddles multiplied by the numbers of active rods in excess of said minimum number.

6. The apparatus according to claim 2 wherein the means for shifting the ejector rod mounting means comprises a cam follower and a cam surface, one of which follower or surface is mounted to said sleeve and the other of which is stationary, said cam surface having a profile extending along an arc whose center of curvature is coincident with the rotational axis of said arms, said arc having a circumferential length extending over a minority of the length of circular orbit of the ejector shaft.

7. The apparatus according to claim 6 wherein the arcuate length of the cam is about 60°.

8. The apparatus according to claim 2 wherein said means for rotating said ejector shaft while orbiting comprises a stationary toothed wheel secured coaxially with the axis about which said arms rotate, a toothed wheel fastened on said ejector shaft for rotation therewith, and a closed loop flexible member looped around said wheels and engaged with said wheels to effect rotation of said ejector shaft concurrently with orbiting said shaft for keeping said ejector rods vertically oriented.

* * * * *